United States Patent Office 3,415,791
Patented Dec. 10, 1968

3,415,791
COPOLYAMIDE OF 6-AMINO-CAPROIC ACID AND 11-AMINO-UNDECANOIC ACID AND FIBERS THEREFROM
Lawrence W. Crovatt, Jr., Raleigh, and Richard D. Chapman, Durham, N.C., assignors to Monsanto Company, a corporation of Delaware
No Drawing. Filed Jan. 11, 1965, Ser. No. 425,119
3 Claims. (Cl. 260—78)

ABSTRACT OF THE DISCLOSURE

Copolyamides from 11-aminoundecanoic acid and 6-aminocaproic acid exhibit surprisingly improved dye absorption characteristics since 11-aminoundedamide alone exhibits very poor absorption characteristics. In some cases the absorption value of the copolyamide is higher than that of nylon 6 alone. These copolyamides are particularly useful in the production of fibers.

---

Fibers have been prepared, heretofore, from homopolymers obtained from monomeric 11-aminoundecanoic acid (nylon 11), as well as from the monomer 6-aminocaproic acid (nylon 6). The fibers produced from these polymers are generally satisfactory with respect to physical properties important in textile uses, but they have limited affinity for dyestuffs. This is a particularly serious deficiency in the instance of nylon 11 wherein the dye uptake is negligible.

Therefore, it is a principal object of this invention to employ monomeric 11-aminoundecanoic acid and 6-aminocaproic acid to produce a novel polymeric composition which not only has acceptable physical attributes for textile end-uses, but also a fully adequate affinity for dyestuffs.

Other objects and advantages of the invention will become apparent in the course of the following detailed description.

We have found that novel synthetic linear copolyamides of good physical properties for textile uses and with substantial affinity for acid dyestuffs can be obtained by copolymerizing 11-aminoundecanoic acid and 6-aminocaproic acid or their amide-forming derivatives. Said amide-forming derivatives of these acids include the ester, anhydride, amide, lactam, acid halide, N-formyl derivative, carbamate, and, in the presence of water, the nitrile. The monomers may be employed over a very wide range of proportions. That is, copolymers having the aforesaid properties may contain 1 to 99 weight percent of the 11-aminoundecanoic acid monomer and from 99 to 1 weight percent of the 6-aminocaproic acid monomer.

The copolyamides described herein are prepared by procedures well known in the art and commonly employed in the manufacture of heretofore known polyamides. In general, the reactants are heated at a temperature of from 180° C. to 300° C. and preferably from 200° C. to 295° C. until the product has a sufficiently high molecular weight to exhibit fiber-forming properties. This condition is reached when the polyamide has an intrinsic viscosity of at least 0.4, the intrinsic viscosity being defined as $$C \xrightarrow{\lim} 0 \left( \frac{\log_e N_r}{C} \right)$$

in which $N_r$ is the relative viscosity of a dilute solution of the polymer in m-cresol in the same units and at the same temperature and $C$ is the concentration in grams of polymer per 100 cc. of solution. The reaction can be conducted at superatmospheric, atmospheric, or sub-atmospheric pressure. Often it is desirable, especially in the last stage of the reaction, to employ a reduced pressure, which will aid in the removal of the reaction by-products. Preferably, the reaction is carried out in the absence of oxygen, e.g., in an atmosphere of nitrogen. The amino acids or their amide-forming derivatives which form the polyamide material may be added to the polymerization autoclave together or they may be added separately one to the other, either before or after the polymerization has begun. In addition to the afore-described reactants, delustrants, antioxidants, plasticizers, viscosity stabilizers, and other like modifying agents may be used in the preparation of the copolyamides of this invention. The synthetic linear copolyamides as described herein may be formed into fibers by employing known spinning and drawing conditions conventional for polyamides.

In order to illustrate the invention and advantages thereof with greater particularity the following specific examples are given. It should be understood that they are intended to be illustrative and not limitative. Parts and percents are given by weight unless otherwise indicated.

EXAMPLE I

This example illustrates the preparation of filaments from the previously known poly-omega undeconamide (nylon 11), and will be used as a standard of comparison with the polyamides of this invention.

A solution of 75 parts of 11-aminoundecanoic acid dissolved in 20 parts of water was charged to a stainless-steel, high-pressure autoclave which had previously been purged of air by the use of purified nitrogen. The temperature and pressure in the autoclave were slowly raised until values of 220° C. and 250 p.s.i.g., respectively, were reached. The temperature was then further increased to 243° C., while the pressure was maintained at 250 p.s.i.g. by the removal of steam as condensate. During this time the mixture was continuously agitated by means of a wall scraping blade contained within the autoclave. Next, the pressure was gradually reduced to atmospheric over a 25 minute period and the polymer melt was allowed to equilibrate for 30 minutes at 278° C. Upon completion of the reaction, the finished polymer was extruded directly from the autoclave through a 14-hole spinneret yielding white multi-filament yarn. This yarn was machine drawn and exhibited good textile properties.

EXAMPLE II

This and the following examples illustrate the preparation of filaments from the copolyamides of this invention.

A copolyamide having a weight ratio of 99:1 of poly-omega undeconamide and poly-epsilon caproamide, respectively, was prepared as follows: one-hundred eight parts of 11 - aminoundecanoic acid, 1 part of epsilon caprolactam, and 33 parts of water were charged to a stainless-steel high-pressure autoclave which had previously been purged of air by the use of purified nitrogen. The temperature and pressure were slowly increased until values of 220° C. and 250 p.s.i.g. respectively were reached. Then the temperature was further increased to 243° C. while the pressure was maintained at 250 p.s.i.g. by the continuous removal of steam as condensate. During this period of temperature rise, the mixture was slowly and continuously stirred. Next, the pressure was gradually reduced to atmospheric over a 25 minute period and the polymer melt was allowed to equilibrate for 30 minutes at 278° C. The final molten copolyamide was melt spun directly from the bottom of the autoclave through a 14-hole spinneret to yield white multi-filament yarn. The yarn thus obtained was machine drawn and exhibited good textile properties.

EXAMPLE III

Filaments from the copolyamide consisting of poly-omega undeconamide and poly-epsilon caproamide in a weight ratio of 9:1, respectively, were prepared as follows. Ninety-nine parts of 11-amino-undecanoic acid, 10 parts of epsilon caprolactam, and 20 parts of water were charged to stainless-steel, high-pressure autoclave which had previously been purged of air by the use of purified nitrogen. This mixture was then polymerized and melt spun in the manner as described in Example II to obtain white multi-filament yarn having good textile properties.

EXAMPLE IV

In this example filaments were prepared from a copolyamide consisting of poly-omega undeconamide and poly-epsilon caproamide in a weight ratio of 1:1, respectively, as follows: Fifty-five parts of 11-aminoundecanoic acid, 50 parts of epsilon caprolactam, and 20 parts of water were charged to a stainless-steel, high-pressure autoclave which had previously been purged of air by the use of purified nitrogen. The solution was then put through the condensation polymerization reaction of Example II to yield a white multi-filament yarn. The yarn thus obtained was machine drawn and exhibited good textile fiber properties.

EXAMPLE V

In this example filaments were prepared from a copolyamide consisting of poly-omega undeconamide and poly-epsilon caproamide in a weight ratio of 1:9, respectively. A solution of 11 parts of 11-aminoundecanoic acid and 90 parts of epsilon caprolactam dissolved in 33 parts of water was added to a stainless-steel, high-pressure autoclave which had previously been purged of air by the use of purified nitrogen. The copolyamide was obtained following the procedures described in Example II. The polymer, thus obtained, was melt spun directly from the bottom of the autoclave through a 14-hole spinneret yielding a white multi-filament yarn. The yarn exhibited good fiber properties.

EXAMPLE VI

This example illustrates the preparation of filaments from another previously known polyamide, poly-epsilon caproamide (nylon 6), and is to be used as a further standard of comparison with the filaments prepared from the copolyamides of this invention.

A solution of 100 parts of epsilon caprolactam dissolved in 20 parts of water was charged to a stainless-steel, high-pressure autoclave which had previously been purged of air by the use of purified nitrogen. The mixture was then slowly heated and pressurized until values of 220° C. and 250 p.s.i.g. respectively were reached. The temperature was further increased to 243° C., while the pressure was maintained at 250 p.s.i.g. by the removal of steam as condensate. During the period of heating, the mixture was continuously agitated by means of a wall scraping blade. The pressure was then gradually reduced to atmospheric over a 25 minute period and the polymer melt was allowed to equilibrate for 30 minutes at 278° C. Upon completion of the reaction, the finished polymer was melt spun directly from the autoclave through a 14-hole spinneret yielding a white multi-filament yarn. These yarns exhibited good textile properties and were capable of being machine drawn.

In order to demonstrate the practical usefulness of the copolyamides of the present invention, comparative tests of the above examples were conducted to determine relative receptivity for acid dyestuffs. Samples of the yarn of each of the above examples were dyed with comparable concentrations (3.0 percent based on the weight of the yarn) of the commercial dyestuff Scarlet 4RA Conc. CF (C. I. Acid Red 18). The dyeing was conducted in a bath having a liquor to fiber ratio of 40:1 and a pH of 3.1, adjusted by the use of formic acid. The bath temperature was maintained at 100° C. and the dyeing period was 2 hours in length. Dye absorption values were determined by measuring spectrophotometrically the changes in dye bath concentration, i.e., the difference between the original dye concentration and the dye concentration after equilibrium (saturation) conditions had been reached. The following test results were obtained:

| Example | Copolyamide composition | | Equilibrium acid dye absorption value, percent |
|---|---|---|---|
| | Wt. percent epsilon-caprolactam | Wt. percent 11-aminoundecanoic acid | |
| I | 0 | 100 | 0.14 |
| II | 1 | 99 | 1.75 |
| III | 10 | 90 | 2.15 |
| IV | 50 | 50 | 2.34 |
| V | 90 | 10 | 2.70 |
| VI | 100 | 0 | 2.30 |

It is readily appaernt from the above test results that the copolymers of this invention have an improved dye absorption in all embodiments tested over that of the homopolymer obtained from 11-aminoundecanoic acid, and several embodiments show an improvement in dye receptivity over the homopolymer obtained from epsilon-caprolactam.

Obviously, numerous modifications and variations of the present invention are possible in the light of the above teachings. It is therefore to be understood that within the scope of the appended claims the invention may be practiced otherwise than as specifically described therein.

What we claim is:

1. A fiber-forming synthetic linear copolyamide of (A) a compound selected from the group consisting of 11-aminoundecanoic acid and the amide forming derivatives of said acid, and (B) a compound selected from the group consisting of 6-aminocaproic acid and the amide forming derivatives of said acid, said reactants being present in said copolyamide in a weight ratio of 99:1 to 1:99, respectively.

2. A textile fiber of the copolyamide as defined in claim 1.

3. The fiber-forming, synthetic, linear copolyamide as defined in claim 1 wherein said reactants are present in said copolyamide in a weight ratio of (A) to (B) of between 1:1 and 1:9.

References Cited

UNITED STATES PATENTS

| 2,071,253 | 2/1937 | Carothers | 260—78 |
| 2,276,160 | 3/1942 | Coffman et al. | 260—78 |
| 2,907,755 | 10/1959 | Lautenschlagor et al. | 260—78 |
| 3,061,592 | 10/1962 | Schnell et al. | 260—78 |
| 3,216,976 | 11/1965 | Schwartz et al. | 260—78 |

WILLIAM H. SHORT, Primary Examiner.

H. D. ANDERSON, Assistant Examiner.

U.S. Cl. X.R.

260—78; 8—55